United States Patent
Belitz et al.

[11] 3,777,635
[45] Dec. 11, 1973

[54] DEVICE FOR FEEDING EXPOSURE VALUES TO APPARATUS INCLUDING PHOTOELECTRIC EXPOSURE METERS AND CONTROL DEVICES

[75] Inventors: Fritz Belitz, Giessen-Kl. Linden; Karl-Richard Bender, Weilburg (Lahn), both of Germany

[73] Assignee: Minox GmbH, Giessen, Germany

[22] Filed: Jan. 31, 1972

[21] Appl. No.: 222,240

[30] Foreign Application Priority Data
Feb. 6, 1971  Germany............. P 21 05 573.2

[52] U.S. Cl.............................. 95/10 CT, 95/53 EB
[51] Int. Cl. ............................................. G03b 7/08
[58] Field of Search ................ 95/10 CT, 53 EA, 95/53 EB

[56] References Cited
UNITED STATES PATENTS
3,651,744  3/1972  Okada................. 95/53 X 3,348,462  10/1967  Fahlenberg.................... 95/53

Primary Examiner—Samuel S. Matthews
Assistant Examiner—Michael L. Gellner
Attorney—Frederick E. Hane et al.

[57] ABSTRACT

In a photographic system, a pulse generator generates a multicycle pulsating D.C. voltage whose medium or average value can be varied. The voltage is fed, via a photoconductive means, to an integrating capacitor which is connected to a threshold circuit. The threshold circuit operates when the voltage across the capacitor reaches a predetermined value to control a photographic element such as a shutter. The value of the pulsating D.C. voltage is controllably varied in accordance with desired exposure values such as film speed or lens opening to be set into the system.

10 Claims, 6 Drawing Figures

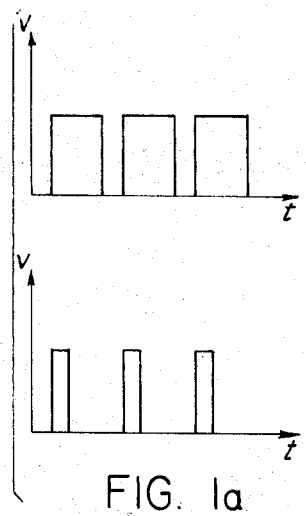
FIG. 1a
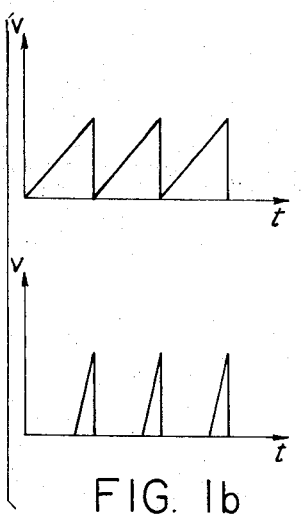
FIG. 1b
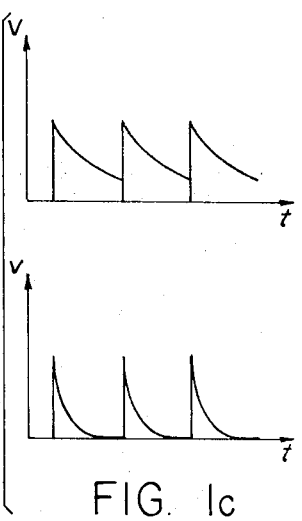
FIG. 1c
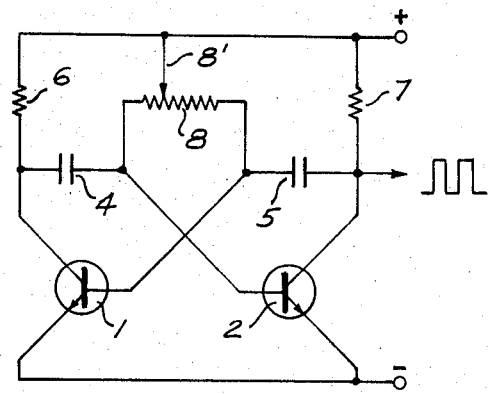
FIG. 2
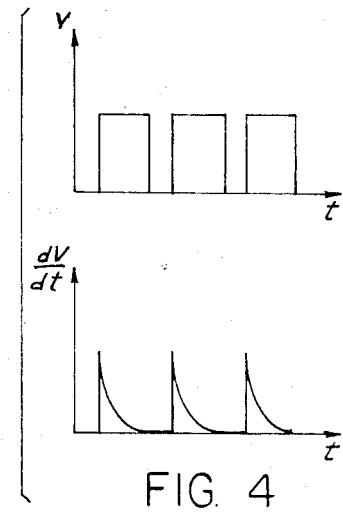
FIG. 4
FIG. 3
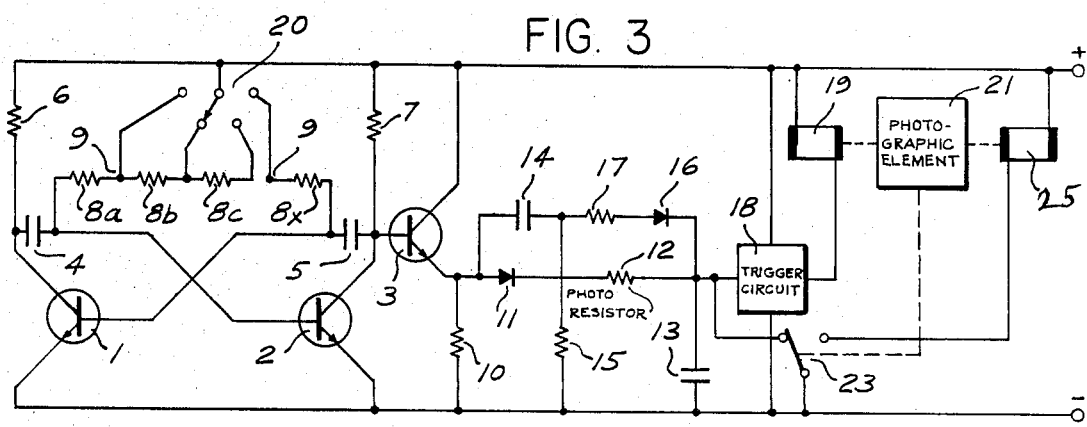

DEVICE FOR FEEDING EXPOSURE VALUES TO APPARATUS INCLUDING PHOTOELECTRIC EXPOSURE METERS AND CONTROL DEVICES

The invention relates to an electronic device for feeding to photographic devices or photographic recording devices equipped with light measuring systems and control systems exposure values which are varied by, for instance, the shutter speed or the light sensitivity of light-sensitized materal or the diaphragm opening of a taking objective.

More particularly, the invention relates to an electronic device of the general kind above referred to which uses the application of a pulse-shaped voltage signal for energizing timing circuits.

BACKGROUND

There are known various techniques and apparatus which serve to feed exposure values to devices including photoelectric light meters and control devices. In such known devices the sensitivity of a photocell is varied by interposing operating light stops or diaphragms or so-called grey filters. To obtain a gradual or continuous variation for a large range, a high precision of the light stops or diaphragms or filters is necessary and the required mechanical linkages must also be of a high precision type.

It is also known and possible to influence the light measuring or controlling circuitry directly by suitable electrical components. For instance, by means of electrical resistance the sensitivity of exposure or light meters can be changed within wide limits. However, with exposure meter systems which automatically set the variation of the exposure time control, merely by the interposition of electrical resistors, is possible only to a limited extent. In such systems, the resulting exposure time is controlled by the current supplied by a photocell and by the electric characteristics of a circuit which effects a phase shift between current and voltage. In a system of this kind, as frequently used, the resistance value of a photoresistor controls the current which is delivered by a constant voltage battery, to charge a capacitor. When the voltage across this capacitor reaches a predetermined voltage value it activates a trigger circuit which initiates the termination of the exposure.

In a timing circuit of this kind exposure values cannot be represented by a series or parallel combination of electrical resistors within the circuit because the required resistance value needed to cooperate with the resistance value of the photoresistor cannot be obtained. For this reason sometimes several photoresistors with the same characteristics are used. Such photoresistors can then be selectively connected in series or in parallel.

The potential dividing of the operating voltage by a predetermined value by means of resistors can also be used to represent the exposure values. However, this technique is practical only within a very limited range — about a range of 1 to 4. It has been found that if the operating voltage is reduced by a greater factor the switching threshold for the trigger circuit cannot be reached. The situation is similar if by use of variable resistors in a switching amplifier the switching threshold of such amplifier is changed.

Another possibility is the use of variable circuit components or of several fixed phase-shifting circuit components in the timing or charging circuit. For instance, the exposure times can be varied proportional to the capacitance values of a group of switchable or reversible capacitors. However, since the required capacitances are in the order of a few microfarads, numerous capacitors are necessary to represent a smooth variation over a wide range of exposure values. This technique is not only expensive but space-consuming.

THE INVENTION

It is an object of the invention to provide an improved device for supplying selectable exposure values to photographic devices.

It is another object of the invention to provide such a device having a greater range and flexibility over previously available devices.

It is a still further object of the invention to provide such a device which while satisfying the above-mentioned objects is less expensive and so compact as to be incorporated in miniature cameras.

Briefly, the invention contemplates the utilization of constant amplitude pulses whose frequency and/or duty cycle is variable to represent the desired exposure values with the pulses controlling the timing of the operation of the photographic devices.

Other objects, features and advantages of the invention will be apparent from the following detailed description when read with the accompanying drawing which shows, by way of example and not limitation, apparatus for practicing the invention.

DETAILED DESCRIPTION OF THE INVENTION

In the drawing:

FIGS. 1a, 1b and 1c show waveforms of pulsating D.C. voltages and of the associated changes of the medium or average value at the peak voltage;

FIG. 2 is a schematic circuit diagram of an astable multivibrator for varying the width of the pulses;

FIG. 3 is a complete schematic diagram including a square wave generator, an impedance transforming amplifier, a timing network, a differentiator network, a trigger circuit and a solenoid means for controlling the closing of the shutter of a photographic apparatus; and FIG. 4 shows a square wave voltage and a signal derived therefrom by differentiation.

Referring now to the figures more in detail, the concept of the invention uses a pulsating direct current voltage instead of the constant voltage of a battery for charging a timing capacitor via a photoresistor. The waveform of this voltage can be arbitrary, provided that its peak value is markedly above a given switching threshold for a trigger circuit and that its average or medium value can be varied in accordance with the exposure or light value to be fed to the apparatus.

FIGS. 1a, 1b and 1c show a few possible voltage waveforms of this kind.

Since the timing capacitor acts as an integrating circuit component the resulting time when a threshold is reached is determined only by the average or medium value of the voltage and, due to the high pulse peaks, a reliable switching of the threshold circuit is assured. As a result, the accuracy and the timing is considerably improved, especially for long exposure times.

According to a particularly advantageous embodiment, the square wave voltage of an astable multivibrator is used as the charging voltage for the capacitor. The average value per unit of time of this voltage is obtained by varying a time characteristic of the waveform, i.e., the duty cycle of the pulses or of the repetition rate or of both these factors. In any event, it is only necessary to change the value of a timing resistor in the multivibrator.

The astable multivibrator according to FIG. 3 comprises a potentiometer 8 having a slide 8' which can be used to vary gradually the ratio of the pulse duration in relation to the pulse spacing (duty cycle) and thus the value per time unit of the current flow over a large range. To linearize the dependency between the average value of the charging voltage and the position of the slide, the capacitance of capacitor 4 has a smaller value than the capacitance of capacitor 5; a logrithmic potentiometer may also be used. The capacitors and the potentiometer are connected via transistors 1 and 2 and resistors 6 and 7 to a source of direct current to form a typical astable multivibrator configuration. Since the reproducibility of a potentiometer setting with sufficient accuracy may be difficult, the potentiometer 8 of FIG. 2 can be replaced as it is shown in FIG. 3 by a series connection of several fixed resistors 8a, 8b, 8c—8x with taps 9 therebetween. Each tap represents a predetermined tapped variation of the starting voltage and thus corresponds to an exposure or light value to be fed into the device. Since the resulting average value per unit of time of the voltage is controlled only by the ratio of two parts of the total resistor on the two sides of the effective tap 9, it is possible to introduce by short-circuiting one or more of the resistors 8a—8x a greater number of exposure values into the time controlling circuitry than the actual number of resistors 8—8x or taps 9. As a result, the exposure values which can be represented can be conveniently coded in the switching device 20.

In order to assure that there is sufficient time for resolution, the mode of the invention requires that the lowest occurring frequency of the pulse voltage be selected so that the shortest exposure time that occurs still includes a sufficiently large number of pulses, for instance for an exposure time of 1/1000 of a second and a 20 percent tolerance, the lowest frequency could be 5 KH$_z$.

The charging voltage of the multivibrator is matched by an emitter follower stage, consisting of a transistor 3 and a resistor 10, to the load via a timing circuit consisting of photoresistor 12 and capacitor 13. A diode 11 is connected in series with photoresistor 12 to prevent partial discharge of capacitor 13 via resistors 10 and 12 during the pulse intervals. The increasing voltage at capacitor 13 activates in a known manner a trigger circuit 18 which in turn activates a diagrammatically indicated solenoid 19 for operating a photographic element 21 such as the shutter of a photographic apparatus.

Since the charging current for capacitor 13 is controlled by photoresistor 12 and the average value of the charging voltage depends on resistor 8 and the multivibrator, the resulting exposure time is proportional to the product of the resistance values of these two elements. Obviously, the aforedescribed circuit can be modified by arranging the photoresistor in the multivibrator thereby permitting control of the tap ratio at resistor 8. The exposure values can then be set by a variable resistor or by reversible fixed resistors instead of by means of photoresistor 12.

In timing circuits in which a capacitor is used as an integrating circuit component, it is disadvantageous that for setting of very long exposure times the charging current of the capacitor decreases to the magnitude of its leakage current. In such case the obtained exposure times are then very widely separated and in an extreme case the switching threshold of the trigger circuit is never reached. As a result of such failure of a response of the trigger circuit the shutter remains open. Obviously, retention of the shutter in its open position will ruin the photographic operation to be carried out. To avoid such a possibility a resistor of a high ohmic value can be connected in parallel with the photoresistor. Such a resistor assures that the shutter is closed independent of the prevailing light conditions after a predetermined maximum time.

As previously explained, in the exemplified circuit system the exposure time is dependent on the selected tap ratio at the multivibrator. Accordingly, the aforedescribed parallel connection of a high ohmic resistor with the photoresistor would result for each exposure value a different maximum time. This would mean that the possible long exposure times would remain partly unused. To obtain always the same maximum time with the high ohmic resistor which serves to feed to the capacitor, an additional recharge means could be connected to the source of the direct current voltage. However, in such an arrangement the advantages of the charging of the capacitor by means of pulses would be lost within the range of long exposure times. In other words, the accuracy of the system would be reduced and the longest possible exposure time would be shortened.

In the event the astable multivibrator is driven with a constant frequency, that is the change in the tap ratio is obtained only by a change in the pulse duration, it is possible to retain all the aforepointed out advantages of charging the capacitor by pulses and to obtain a constant maximum exposure time and also to avoid the use of a high ohmic resistor and the aforepointed out problems by the use of such resistor.

Such advantageous result is achieved by means of a differentiator network comprising a capacitor 14 and a resistor 15 as shown in FIG. 3. This differentiator network is connected parallel with the photoresistor 12 and decoupled by the diode 16. As a result only a voltage spike is formed for each square wave impulse independently of its length as it is shown in FIG. 4. By including a resistor 17 which does not have to have a very high ohmic value in the connection for the differential signal the maximum exposure time can be set close to the possible or theoretical limit value.

While it has been shown how the circuits control the timing of the operation of the photographic apparatus 21, the overall operation of a camera shutter will now be described for the sake of completeness. Consider the photographic apparatus 21 to be the camera shutter driven by a mechanical toggle device, i.e., when the device is in a first position the shutter is closed and when in a second position the shutter is open. In addition, the toggle device is mechanically connected to a single-pole double-throw switch 23 in such a way that when the toggle device is in the first position switch 23 is in the position as shown in FIG. 3 to short across timing capacitor 13. However, switch 23 is also mechanically connected to the shutter release button of the camera and is switched to its alternate when the shutter release button is depressed. The driving of the mechanical toggle device is accomplished by solenoids 19 and 25. When solenoid 19 is energized the mechanical toggle device is switched to the first position and when solenoid 25 is energized and the device is switched to the second position.

Thus, in operation, when the operator depresses the shutter release button, switch 23 is driven to its alternate position causing capacitor 13 to accumulate charge and start the timing cycle. At the same time switch 23 closes a circuit through solenoid 25 which moves the toggle device to its second position to open the shutter. At the end of the timing interval, i.e., when capacitor 13 accumulates sufficient charge, trigger circuit 18 operates to energize solenoid 19 which closes the shutter by switching the toggle device to its first position.

While the invention has been described in detail with respect to a certain now preferred example and embodiment of the invention, it will be understood by those skilled in the art, after understanding the invention, that various changes and modifications may be made without departing from the spirit and scope of the invention, and it is intended, therefore, to cover all such changes and modifications in the appended claims.

What is claimed is:

1. A device for controlling the operation of a photographic shutter comprising a pulse generator for generating a multicycle pulsating D.C. voltage whose time characteristic is a function of the value of a timing component in the pulse generator, an electrical energy storage means for transmitting a signal whose amplitude is a function of the quantity of stored energy, a photoconductive means connecting the output of said pulse generator to said electrical energy storage means, and a threshold circuit having an input connected to said electrical storage means and an output connected to the photographic element, said threshold circuit operating when sensing a given amplitude signal.

2. The device of claim 1 wherein the value of said timing component is controllably variable.

3. The device of claim 1 wherein said timing component is a controllably variable resistor.

4. The device of claim 3 wherein said controllably variable resistor includes a plurality of serially connected resistors with intermediate taps and means for varying the value of the resistance by connections to selected ones of said intermediate taps.

5. The device of claim 1 further comprising a fixed resistor connected in parallel with said photoconductive means.

6. The device of claim 1 further comprising a signal differentiating means connected in parallel with said photoconductive means.

7. The device of claim 6 further comprising a fixed resistor connected in series with said differentiating means.

8. The device of claim 1 wherein said pulse generator is an astable multivibrator including controllably variable resistance means for determining the duty cycle of the generated pulses, said electrical energy storage means is an integrating capacitor, said photoconductive means is a photoresistor and further comprising a circuit comprising a signal differentiator and resistor connected in series, said circuit being connected in parallel with said photoresistor.

9. The device of claim 1 wherein said electrical energy storage means is an integrating capacitor.

10. The device of claim 2 wherein said electrical energy storage means is an integrating capacitor.

* * * * *